US010087963B2

(12) United States Patent
Greenhill et al.

(10) Patent No.: US 10,087,963 B2
(45) Date of Patent: Oct. 2, 2018

(54) LOCKING DEVICE FOR SECURELY POSITIONING AN OBJECT ON A ROPE OR LINE

(71) Applicant: Smalley Steel Ring Company, Lake Zurich, IL (US)

(72) Inventors: Michael Louis Greenhill, Highland Park, IL (US); David Richard Feingold, Highland Park, IL (US)

(73) Assignee: SMALLEY STEEL RING COMPANY, Lake Zurich, IL (US)

( * ) Notice: Subject to any disclaimer, the term of this patent is extended or adjusted under 35 U.S.C. 154(b) by 181 days.

(21) Appl. No.: 14/980,906

(22) Filed: Dec. 28, 2015

(65) Prior Publication Data

US 2017/0183066 A1 Jun. 29, 2017

(51) Int. Cl.
*F16B 2/14* (2006.01)
*B63B 59/02* (2006.01)
*F16B 2/00* (2006.01)
*B63B 21/08* (2006.01)
*B60R 19/18* (2006.01)

(52) U.S. Cl.
CPC .............. *F16B 2/005* (2013.01); *B63B 21/08* (2013.01); *F16B 2/14* (2013.01); *B63B 2059/025* (2013.01)

(58) Field of Classification Search
CPC ...... F16B 2/005; F16B 2/14; B63B 2059/025; B63B 21/08; Y10T 24/3956; Y10T 24/3969; Y10T 24/3973; Y10T 24/3996
See application file for complete search history.

(56) References Cited

U.S. PATENT DOCUMENTS

| 1,408,230 | A | * | 2/1922 | Slaymaker | ............ | F16G 11/048 |
| | | | | | | 403/211 |
| 2,529,327 | A | * | 11/1950 | Carlson | .................... | D06F 53/00 |
| | | | | | | 24/136 R |
| 4,078,277 | A | * | 3/1978 | McCracken | .......... | F16G 11/106 |
| | | | | | | 174/45 R |

(Continued)

OTHER PUBLICATIONS

Taylor Made Products 2016 Catalog; Taylor Made Group; 88 pgs. Oct. 2015.

(Continued)

*Primary Examiner* — Robert Sandy
*Assistant Examiner* — Matthew J Sullivan
(74) *Attorney, Agent, or Firm* — DLA Piper LLP US

(57) ABSTRACT

A locking device for securing and positioning an object when it is strung on a line by a through-hole of the object. The locking device includes an elongated shaft defining a partial cavity formed therein. The elongated shaft or a deepest portion of the partial cavity or both is tapered relative to a longitudinal axis of the shaft. The partial cavity extends along the longitudinal axis of the shaft, and the deepest portion of the partial cavity and the exterior surface of the elongated shaft forms a tapering angle. The locking device is inserted into through-hole of the object such that the rope or line fits into the partial cavity. Pressure may be applied to put the locking device into the through-hole such that there is no movement between the object and the line; thus securely positioning the object on the line. The locking device may be used to securely position a through-hole type boat fender on a line.

22 Claims, 11 Drawing Sheets

(56) References Cited

U.S. PATENT DOCUMENTS

| | | | | |
|---|---|---|---|---|
| 4,143,446 A | * | 3/1979 | Down | F16G 11/06 24/115 R |
| 7,162,830 B2 | * | 1/2007 | Sims | A01K 91/03 43/44.87 |
| 7,228,599 B2 | * | 6/2007 | Dupont | F16G 11/042 24/115 N |

OTHER PUBLICATIONS

"Big B™ Fender Hanger," Fender Accessories, Taylor Made Products 2016 Catalog; Taylor Made Group; p. 14 Oct. 2015.

* cited by examiner

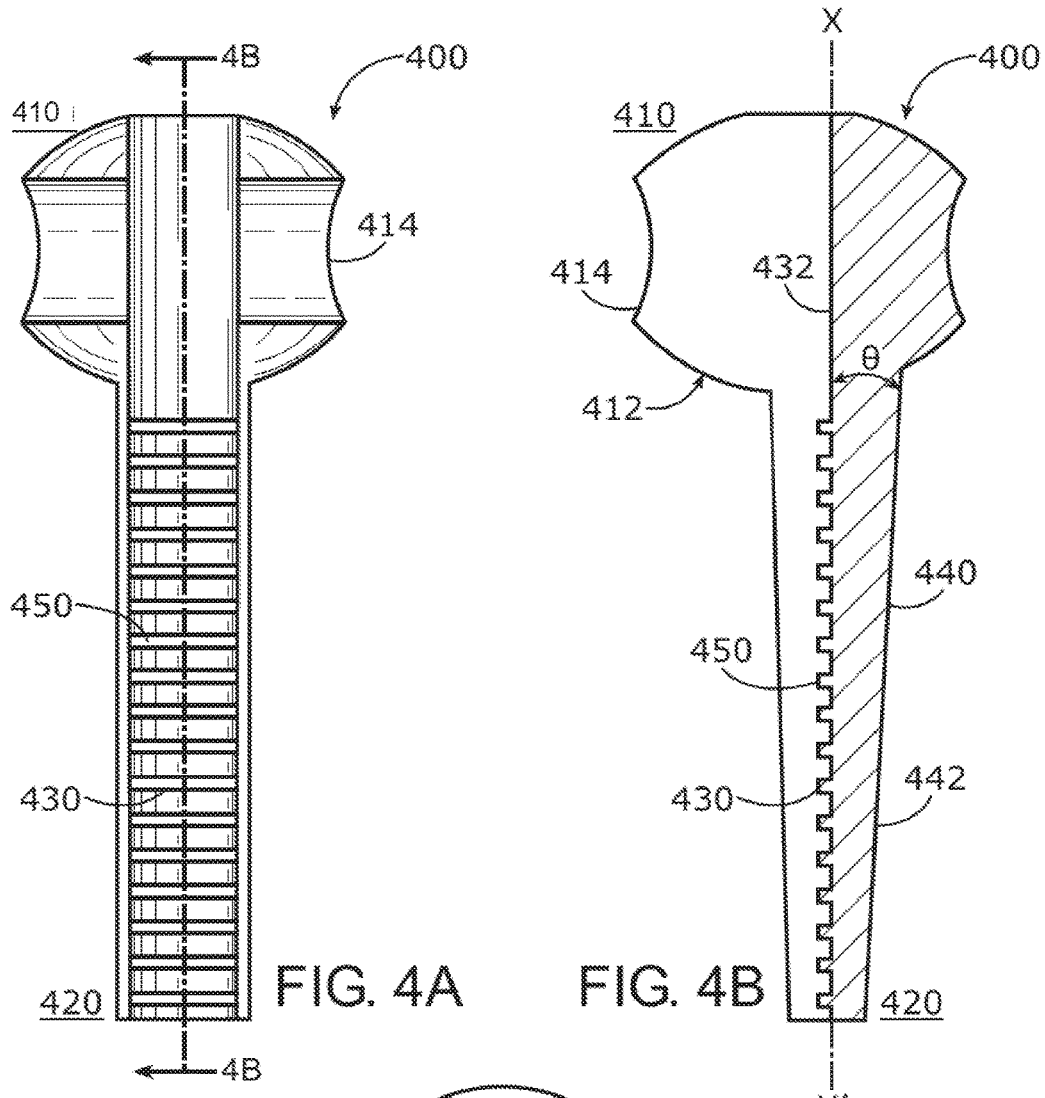

LOCKING DEVICE FOR SECURELY POSITIONING AN OBJECT ON A ROPE OR LINE

Inflatable or padded cushions such as fenders are used in land and water transportation to provide protection to objects to prevent damage from collision. For example, marine fenders keep boats from bumping up against docks, pilings or other watercraft. They may be molded from high quality marine grade vinyl and may include an inflation valve to allow for adjustment for the desired level of firmness. Fenders absorb shock to prevent damage to the hulls of boats that are docked, or anchored. Fenders may be solid and non-inflatable and made of foam or other resilient material or may be inflatable and produced often from vinyl.

Fenders come in a variety of shapes and sizes. They may be round (FIG. 1B), rectangular (FIGS. 1C & 1D) or cylindrical (FIGS. 1A & 1E). Cylindrical fenders are the most common type of boat fender used (see FIGS. 1A & 1E). This type of fender may be hung either horizontally or vertically, dependent on the application. A fender may have one or more eyes 140 at one or both ends by which it is hung (see FIGS. 1A & 1B). With one eye 140, the fenders may hang vertically by knotting one end of a line to the eye 140 and the other to the pier or protected object such that the fender is positioned between the protected object and the pier. Alternatively, a fender may be hung horizontally by running one or more lines through eyes 140 on opposite ends and tying the one or more lines to the pier or the object being protected.

A commonly available type of cylindrical fender may have an opening (e.g., a through-hole) running through the body of the fender, usually along the center of the fender (FIG. 1E). Such fenders are termed by fender manufacturers as "through-hole," "thru-hole," "center hole" or "hole-through-middle" fenders where the fender has been molded with a hole or tube running through the middle of the fender as illustrated in exhibit 1E. As used herein, the term "fender" will refer to the through-hole fender configuration unless otherwise specified. Referring to FIG. 1E, a through-hole fender 100 has a hole 110 through the center. The size of hole 110 may vary to accommodate lines of different sizes. It would be understood that a thin line in a big hole 110 will lead to sliding movement along the line as well as bumping movement against the line. The cylindrical fenders have two ends 120 and 130. The two ends may be identical or different from each other.

Through-hole fenders may be strung on a rope or line either vertically or horizontally (FIGS. 2A and 2B). In FIG. 2A, two fenders are hung on the side of the boat by knots tied at the bottom of the fenders. The fenders may be used in conjunction with fender board 210 which may be hung from the protected object at the pier. It would be understood that the number of fenders used may vary depending on the size of fender board 210. Fender board 210 contacts the dock (e.g. at pilings 220) and prevents scratches on the boat. Unless otherwise specified, the terms "rope" and "line" are used interchangeably.

In FIG. 2B, a fender is strung on a line horizontally along the side of a boat. The horizontal fender provides cushion and prevents scratches. When necessary, multiple through-hole fenders may be installed on the same line to provide protection to a longer object or a larger area.

When installed on a line in various positions or in any position, the through-hole fender configuration has a natural tendency to slide along the line. In a vertical position (e.g., FIG. 2A), the fender may simply slide off the line due to gravity when a knot at the bottom of the fender becomes loose or untied over time. When hung and oriented in a horizontal position (e.g., FIG. 2B), the fender would slide along the line when a force is applied.

DESCRIPTION OF THE DRAWINGS

Those of skill in the art will understand that the drawings, described below, are for illustrative purposes only. The drawings are not intended to limit the scope of the present teachings in any way.

FIG. 4A illustrates a front elevational view of a second exemplary embodiment.

FIG. 4B illustrates a sectional view of the second exemplary embodiment taken along the 4B-4B line in FIG. 4A.

FIG. 4C illustrates a top plan view of the second exemplary embodiment.

DETAILED DESCRIPTION

Figure 3A:
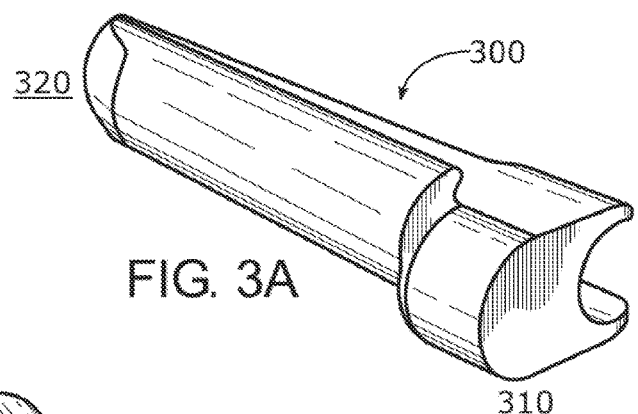
FIGS. 3A-3C illustrate various perspective views of an exemplary embodiment.
Figure 3B:
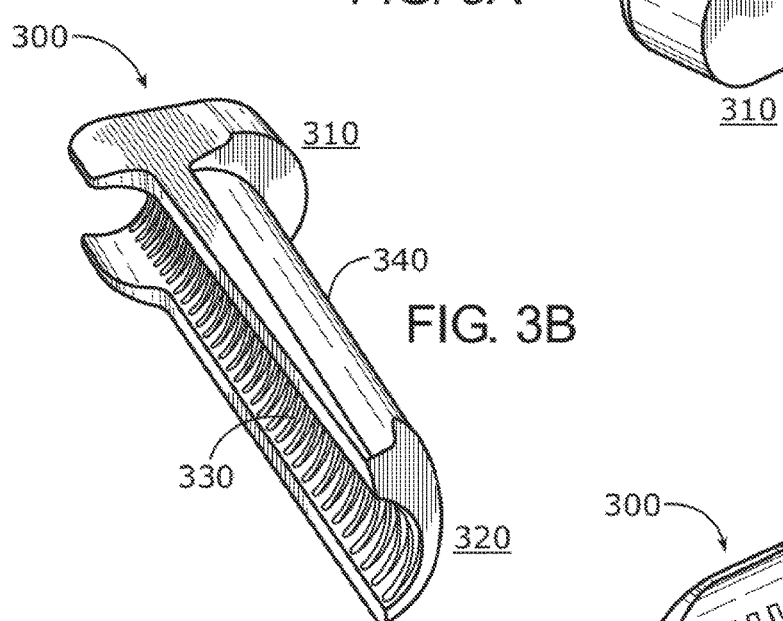
Figure 3C:
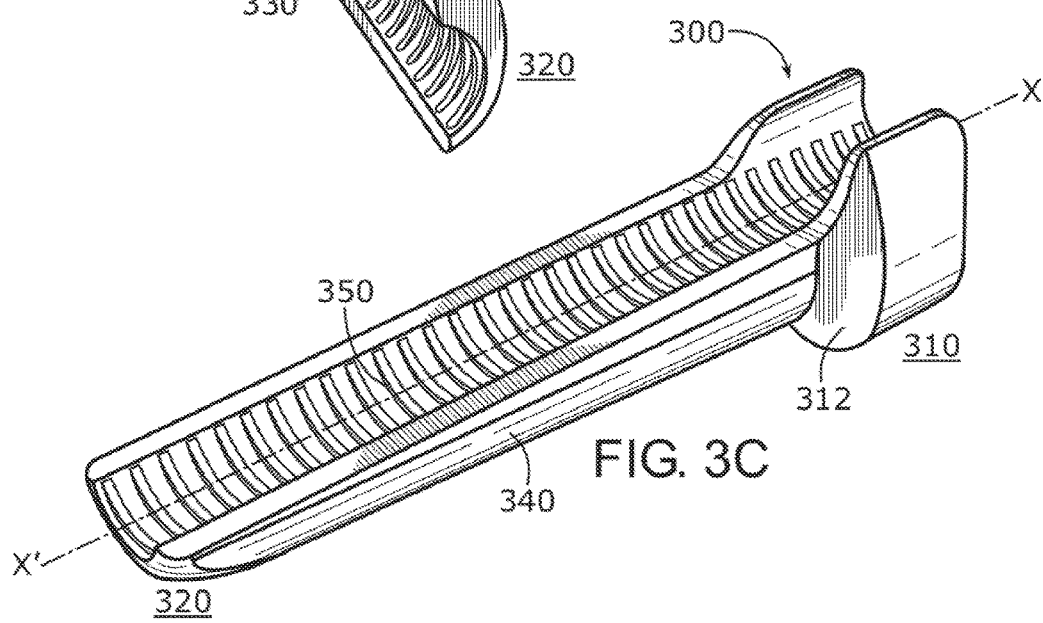

Disclosed herein is a locking device that may be used to prevent a fender or any object from any undesirable movement along a line, either vertically or horizontally. FIGS. 3A through 3C illustrate an exemplary pin-like locking device 300. In some embodiments, the locking device has a head 310 and an elongated shaft 320 that are coupled together. In some embodiments, head 310 and elongated shaft 320 are permanently joined together. In some embodiments, the locking device only has an elongated shaft. In some embodiments, the lengths of shaft 320 and head 310 are determined by an axis along the shaft (e.g., axis x-x' as depicted in FIG. 3C). In some embodiments, a pin-like locking device has a shaft 320 that is longer than head 310. In some embodiments, head 310 has a width that is larger than that of shaft 320. In fact, part of head 310 form a protruded extension 312, which prevents the pin from completely sliding into a through-hole, thereby locking the device against the fender. Shaft 320 may be tapered along its length: its width gradually decreases from where shaft 320 is connected with head 310.

On one side of the permanently connected head and shaft is front side or interior surface 330. In some embodiments, front side 330 of locking device 300 is inwardly curved, forming a partial cavity into which a line or rope is held. When in action, front side 330 is pressed against the line to hold it and keep it from moving. In some embodiments, design or pattern for increasing the frictional force between a line and the locking device may be found along front side 330. Referring to FIGS. 3B and 3C, rib-like structures 350 perpendicular to longitudinal axis X-X' may be found on front side 330 (e.g., the surface of the partial cavity). In some embodiments, the longitudinal axis is the center line of an object. In some embodiments, the longitudinal axis is the principal axis of an object. These horizontal ribs may help the locking device to hold the line in place. In some embodiments, the spacing between the ribs or their depth may be varied to enhance friction such that locking device 300 may tightly hold a line or rope in place to prevent sliding or wobbling motion.

Opposite to interior surface 330 is back side or exterior surface 340. Back side 340 has a curved outer surface and fits into the through-hole opening of the fender. In some embodiments, back side 340 may also have design or pattern that helps to increase the interaction between the locking device and the through hole of the locking device.

FIGS. 4A through 4C illustrate an alternative design of an exemplary pin-like locking device. FIG. 4A depicts a front view of locking device 400, revealing the horizontal ribs 450 on front side 430. The side view in FIG. 4B shows the spacing between the ribs 450. The horizontal ribs 450 may increase interactions between a line and the locking device when the locking device is inserted into the through-hole of a through-hole fender while it is strung on a line. It would be understood that sizes and shapes of the ribs 450 are not limited to those depicted in FIG. 4B. For example, instead of rectangular edges, the ribs may have triangular edges. In some embodiments, instead of ribs, front side 430 may have bumps, waves, or any other design or pattern that can increase the interaction between a line and the locking device.

Head 410 may take any shape or size. Head 410 may have a width larger than that of shaft 420. For example, FIG. 4C shows a circular head 410 bearing a U-shaped cavity 430 while FIGS. 3A through 3C show a different shaped head 310. In some embodiments, the side of head 410 may be slightly curved at 414 to provide a user with easy grip of the locking device. In some embodiments, head 410 has a flat top surface. A user can either use a hand or a hammer to forcefully insert the locking device into the though-hole.

Figure 5:
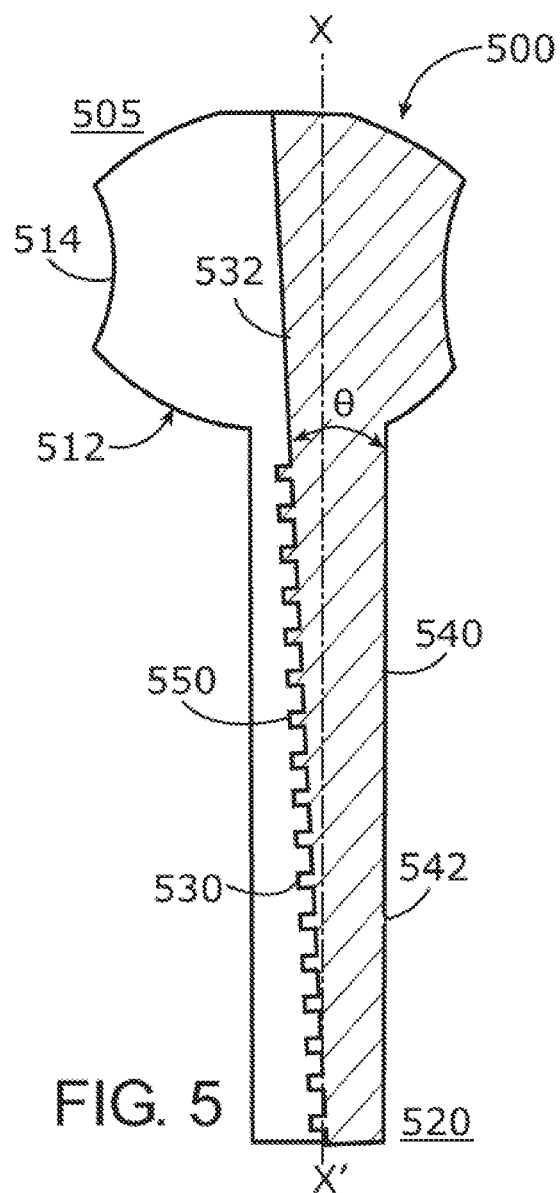
FIG. 5 illustrates a third exemplary embodiment.

Overall, shaft 320, 420 functions like a wedge. It has a smaller dimension at one end that allows it to be inserted easily into a through-hole. As the shaft is pushed further into the through-hole, the increasingly larger dimension leaves less and less room between the locking device and the through-hole, allowing stronger interactions between the locking device and a line in the through-hole. The shape of the wedge-like shaft may be defined by tapering angle θ, between line 442 and line 432, as illustrated in FIG. 4B. Line 432 represents deepest portion of the U-shaped cavity where the front side 430 intersects with the cross-sectional plane. Line 442 represents where the back side 440 intersects with the cross-sectional plane. In some embodiments, line 432 overlaps with center line X-X'. In some embodiments, line 432 does not overlap with center line X-X'. In some embodiments, line 432 is parallel to center line X-X'. In some embodiments, line 432 is not parallel to center line X-X'. FIG. 5 depicts an alternative embodiment where the front side and ribs are tapered related to the center line of the locking device. In such embodiments, the tapering angle is defined by line 532 and 542. Here, line 532 no longer overlaps with and is not parallel to center line X-X'.

The locking device is more effective when the shaft is a shallow wedge; i.e., when θ is small. A shallow wedge allows larger surfaces of interaction between the back surface and the inside of the through-hole. In some embodiments, the shaft of a locking device has a θ of 10 degrees or smaller. In some embodiments, the shaft of a locking device has a θ of 8 degrees or smaller. In some embodiments, the shaft of a locking device has a θ of 6 degrees or smaller. In some embodiments, the shaft of a locking device has a θ of 4 degrees or smaller. In some embodiments, the shaft of a locking device has a θ of 2 to 10 degrees. In some embodiments, the shaft of a locking device has a θ of 2 to 7 degrees. In some embodiments, the shaft of a locking device has a θ of 3 to 5 degrees. In some embodiments, the shaft of a locking device has a θ of about 3 degrees.

Alternatively, the shaft may be cylindrical as illustrated in FIG. 5. The deepest portion of the U-shaped cavity (e.g., elements 432 and 532) may be tapered relative to the shaft. Alternatively, both the outer surface of the shaft and the deepest portion of the U-shaped cavity may both be tapered relative to the longitudinal axis of the shaft. In any of these arrangements, the angle of taper may be as defined in the previous paragraph.

Fenders are positioned in specific locations between two objects to protect and prevent damage to either object. For example, when a boat is tied up alongside another object, such as a pier (dock) (e.g., FIG. 6), a piling (e.g., FIGS. 2A and 2B) or another boat, one or more boat fenders are frequently deployed to prevent damage to the hull of the boat, the object or both. Locking device 300 may be used in any of these scenarios. For example, in FIG. 6, through-hole fenders are each suspended vertically alongside the hull by a line (e.g., element 510). One end of the line is attached to the fender and the other free end is attached to either the boat itself or the other object that is being protected, placing the fender between the boat and the protected object.

On the other end, line 510 is tied into a knot to prevent the line from slipping. Locking device 300 may be used as an alternative to a knot. In some embodiments, locking device 300 may be used in addition to a tied knot to provide added security.

The fender may be hung vertically (e.g., FIGS. 2A, 6, 7A and 7C) or may be hung horizontally (e.g., FIG. 2B and FIG. 7B), dependent on the situation. One or more locking devices as disclosed herein may be used to position the fender in any situation.

Figure 1A:
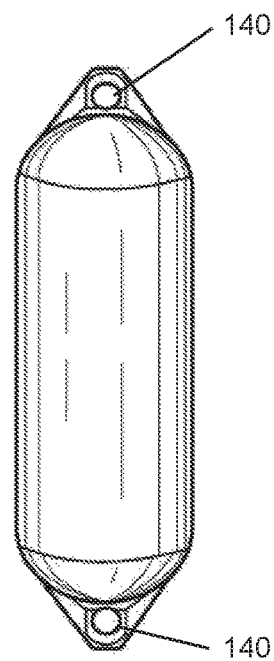
FIG. 1A illustrates an exemplary embodiment known in the art.
Figure 1B:
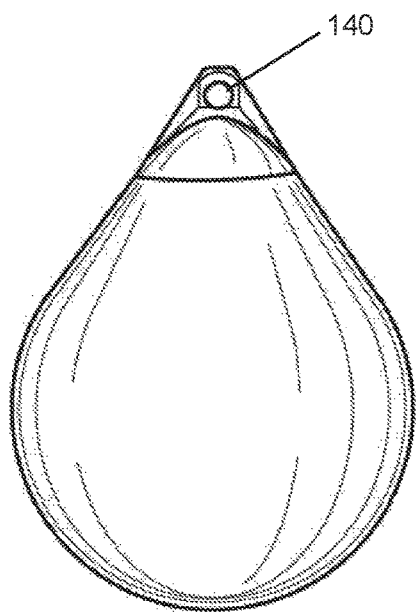
FIG. 1B illustrates an exemplary embodiment known in the art.
Figure 1C:
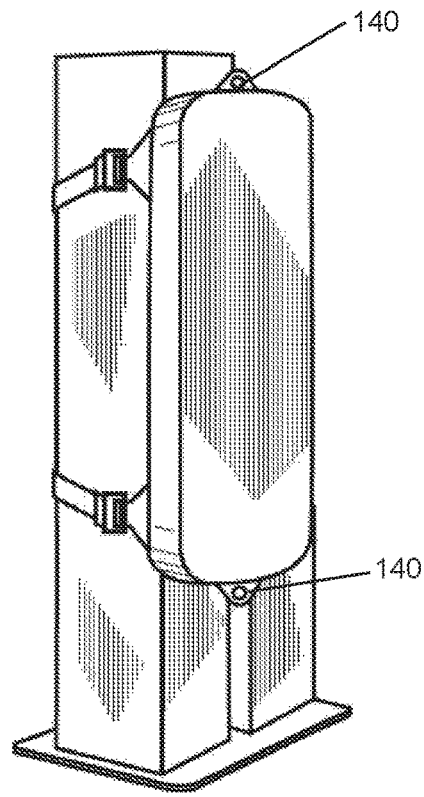
FIG. 1C illustrates an exemplary embodiment known in the art.
Figure 1D:
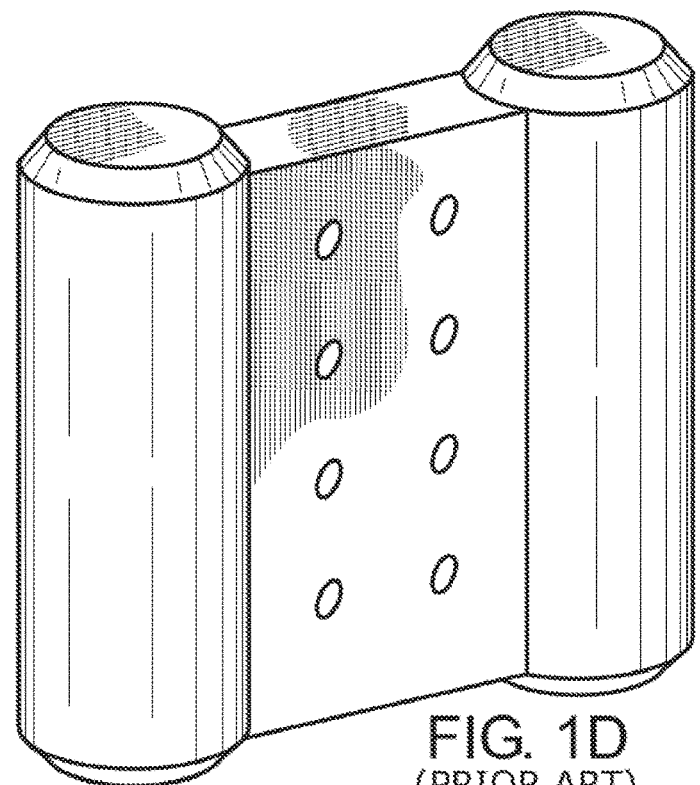
FIG. 1D illustrates an exemplary embodiment known in the art.
Figure 1E:
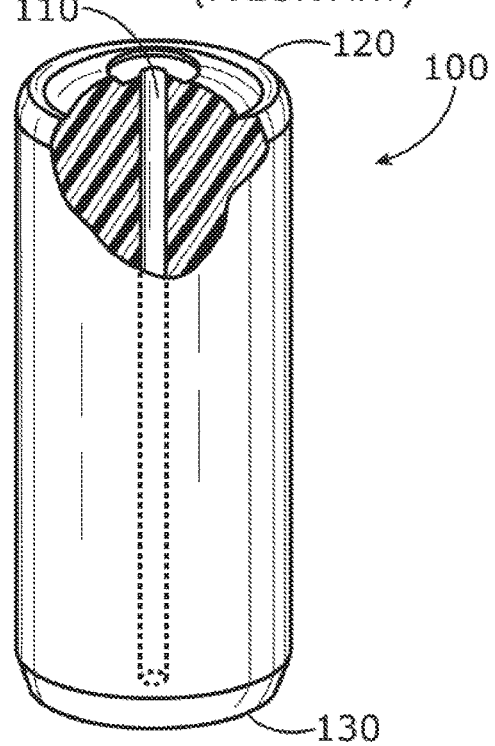
FIG. 1E illustrates an exemplary embodiment known in the art.
Figure 2A:
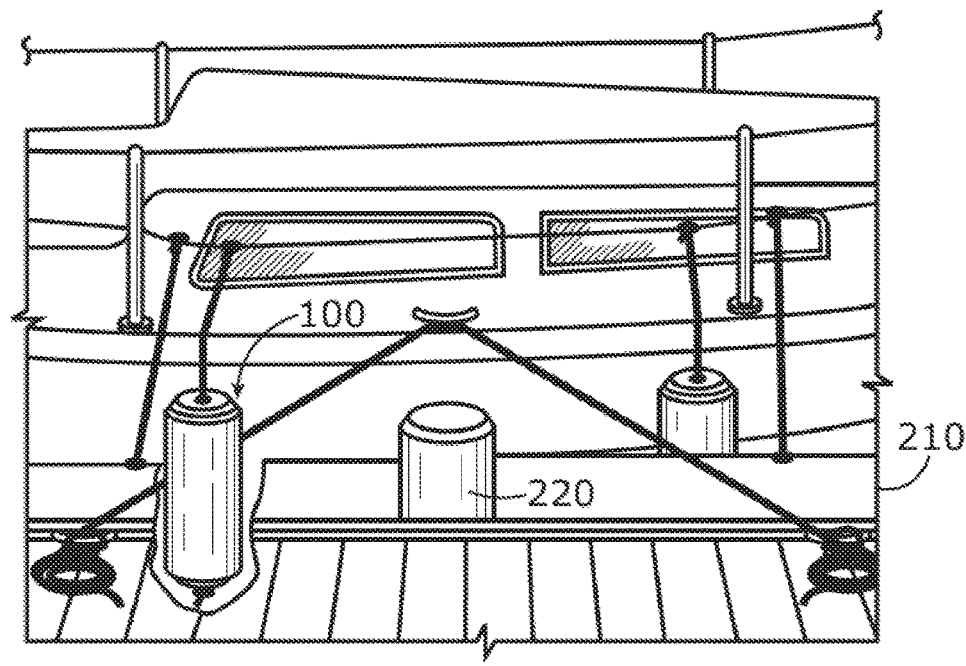
FIG. 2A illustrates an exemplary embodiment known in the art.
Figure 2B:
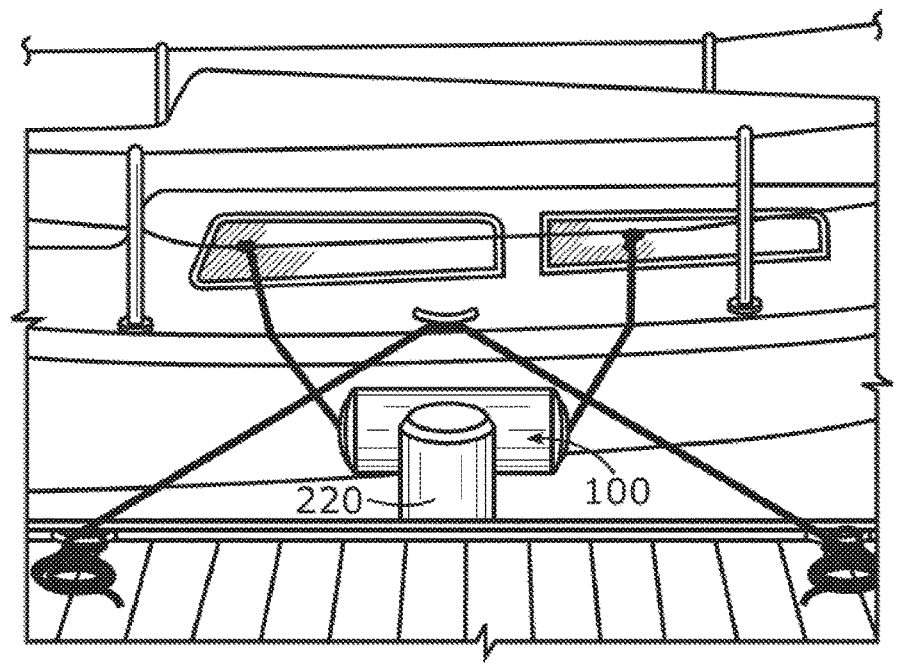
FIG. 2B illustrates an exemplary embodiment known in the art.
Figure 6:
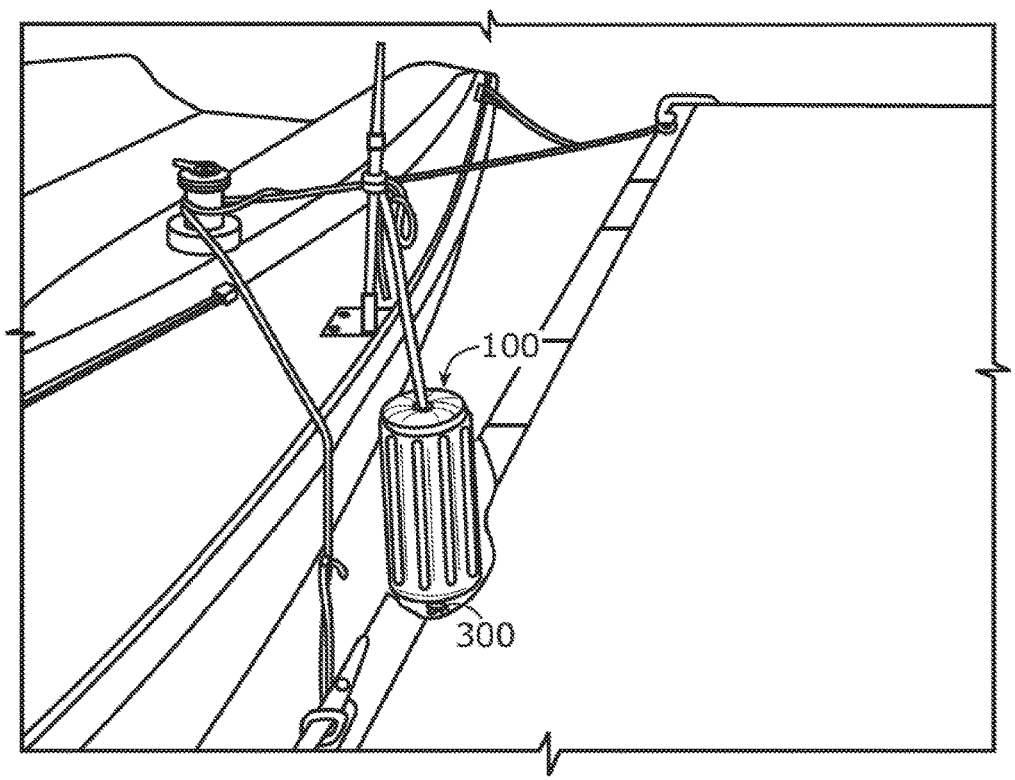
FIG. 6 illustrates an exemplary embodiment.
Figure 7A:
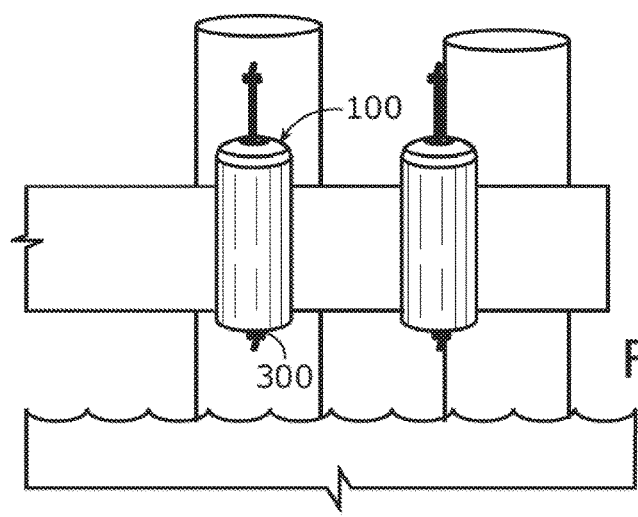
FIG. 7A illustrates an exemplary embodiment.
Figure 7B:
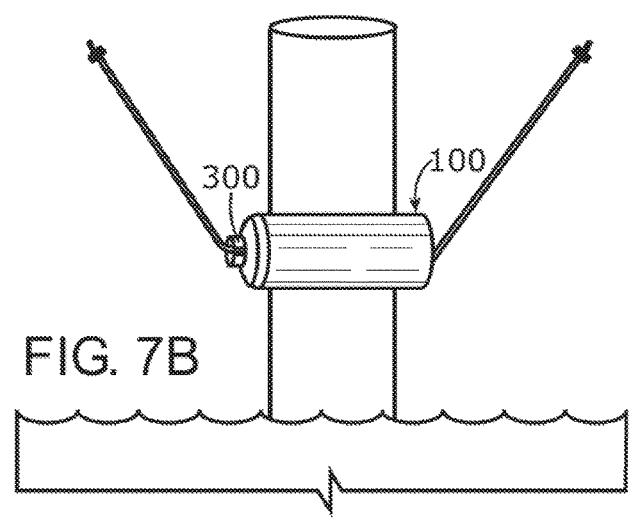
FIG. 7B illustrates an exemplary embodiment.
Figure 7C:
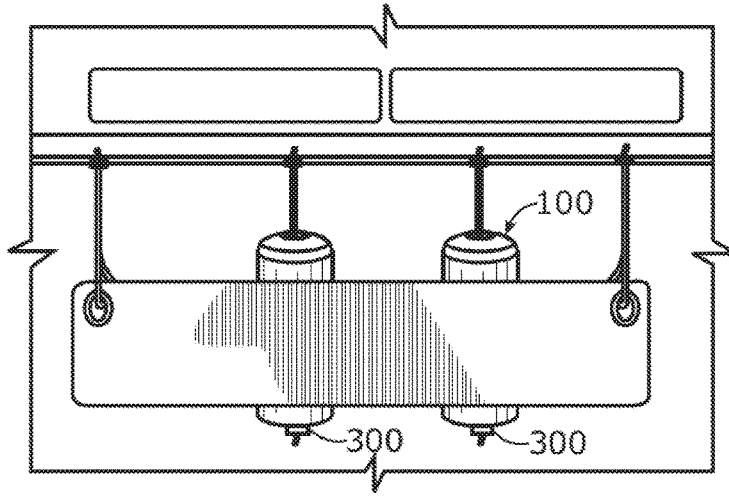
FIG. 7C illustrates an exemplary embodiment.

In some embodiments, fenders are used on a boat to prevent damage to the boat from other objects such as a pier post, a piling or another boat (e.g., FIGS. 2A, 2B and 6). In these situations, fenders are commonly hung vertically. In some embodiments, fenders are used on a pier post or a piling to prevent it from being damaged by other objects such as a boat. Here, a fender may be tied vertically (FIGS. 7A and 7C) or horizontally (FIG. 7B).

In the vertical configuration, one end of the fender line is tied to either the boat, pier or other stationary object, and runs vertically through the fender hole. Conventionally, a knot has been tied on the end beneath the fender to prevent it from sliding off the line due to gravity. In some embodiments, locking device 300 is used by itself instead of a knot.

In some embodiments, a locking device 300 may be inserted at both ends of the through-hole to securely position a fender along a line, regardless whether the fender may be hung horizontally or vertically.

In order to provide protection to a large object or a wide area, multiple fenders may be strung on the same line, either vertically or horizontally. In some embodiments, a locking device is placed at one end of the multiple fenders; for example at the bottom of the through-hole opening of a vertically hung fender. In some embodiments, a locking device is placed at one end of each vertically hung fender; for example at the bottom of the through-hole opening. In some embodiments, locking devices are placed at both ends of a fender; for example, on both sides of the through-hole of a horizontally strung fender. In some embodiments, locking devices are placed at both ends of each horizontally positioned fender among multiple fenders strung on the same line.

Figure 8:
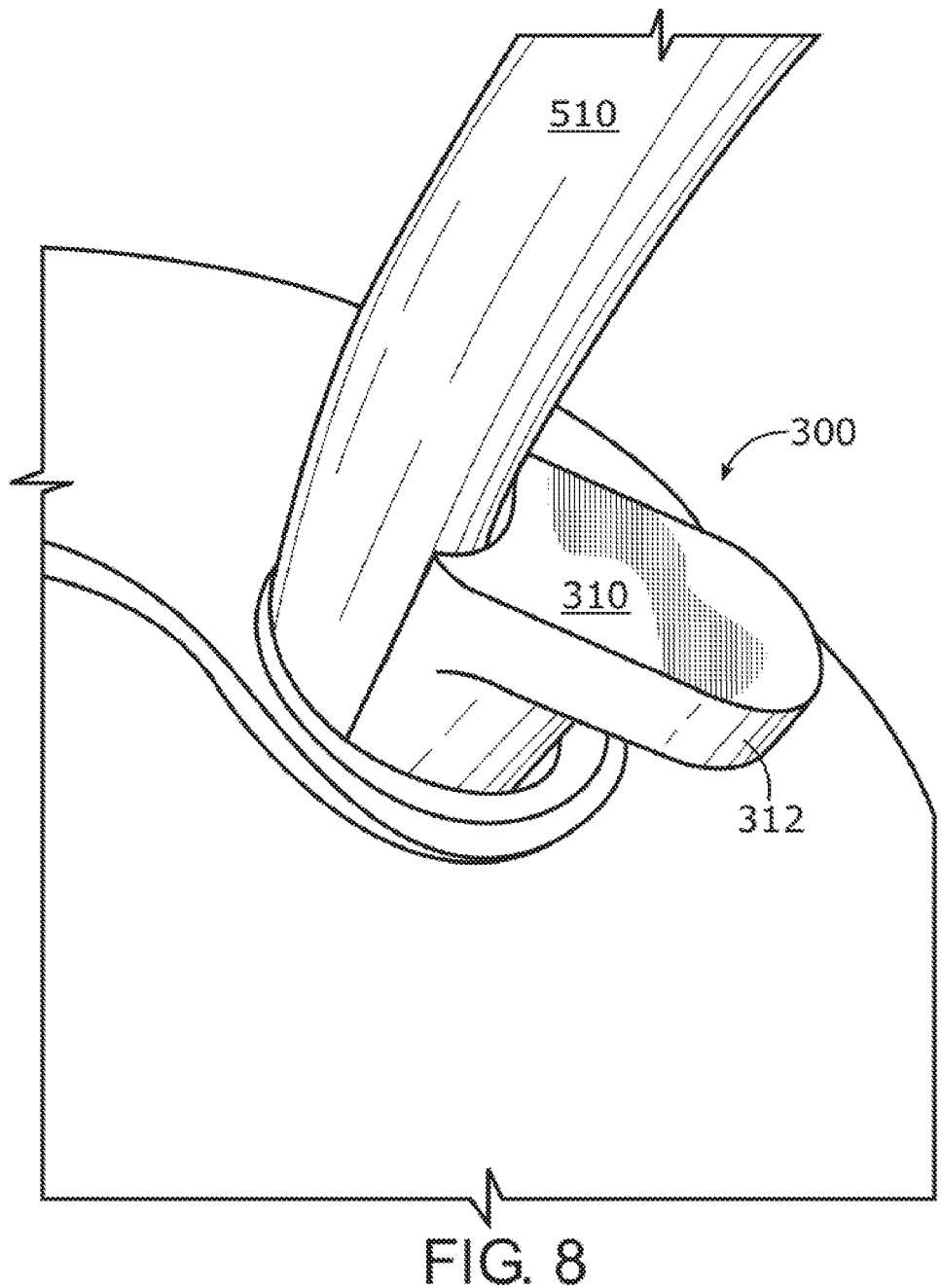
FIG. 8 illustrates an exemplary embodiment.
Figure 9:
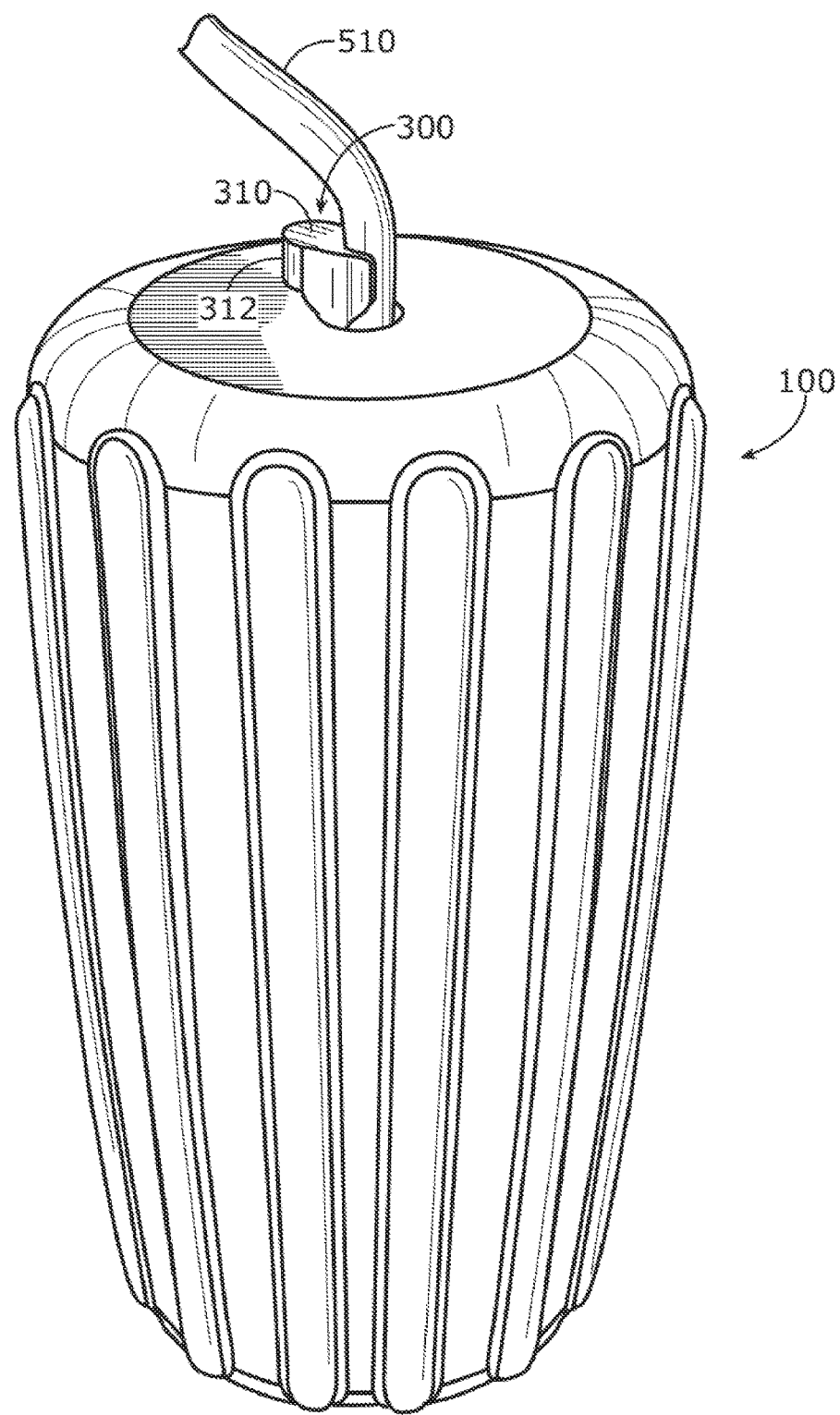
FIG. 9 illustrates an exemplary embodiment.

Referring to FIGS. 8 and 9, a pin-like locking device (e.g., element 300 as illustrated or elements 400 or 500 (not shown)) is inserted into one through-hole opening while the fender is already strung on line 510. As illustrated, the partial cavity formed on the interior surface 330 of the locking device 300 accommodates line 510 while ribs or other design on interior surface 330 tightly holds line via frictional force. At the top of the pin-like locking device is a head having a dimension that is larger than the size of the through-hole. A larger head allows the user to press on a larger surface and tap the shaft portion of the locking device firmly into the hole for greater holding strength (e.g., FIG. 8). In particular, a protruded extension 312 in the pin-like locking device creates a locking configuration and prevents the locking device from slipping into the through-hole. As noted above, shaft 320 functions like a wedge. As the shaft is pushed further into the through-hole, the locking device holds a line more tightly to maintain the fender's position along the line (see FIG. 10).

Figure 10:
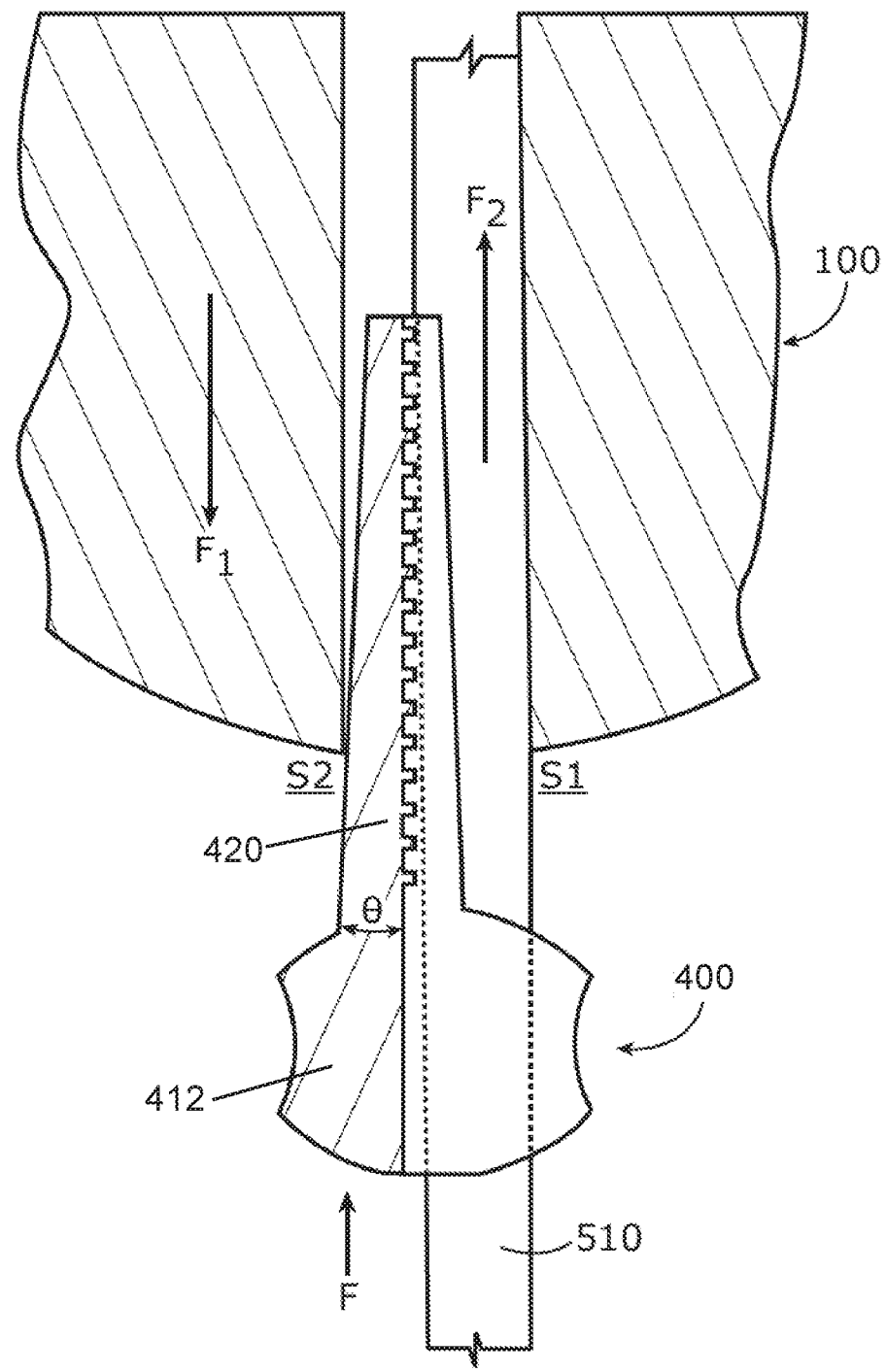
FIG. 10 illustrates an exemplary embodiment.

FIG. 10 provides a sectional view, illustrating how a locking device may be used to prevent all movements of an object such as a fender along a line. As shown, the shaft portion of the locking device is angled and it wedges the line within the fender's hole. The shaft 420 is tapered lengthwise. In the fully wedged position, line 510 is snug against of the fender hole on one side (e.g., S1). The line is also pushed against ribs on the front surface of the shaft. As it is pushed further into the hole by force F (FIG. 10), the shaft is more tightly wedged between the hole and the line running through the hole. On one hand, the weight of the fender creates a downward gravitational force F1. When the fender is hung vertically, line 510 creates an upward pulling force F2. These two forces drag or pull locking device 400 further into the through-hole of the fender until no movement is possible (e.g., when shaft cannot fit into the hole or when header locks the movement due to the presence of the large protruded extension 412). The locking device is tightly against S2, the side opposite to S1 as well. The tight interactions between the fender, line and locking device effectively lock all individual components and prevent any relative movement.

Pattern or design such as the ribs provide extra holding forces. Any suitable design may be created on the interior surface to increase interactions between the line and shaft may be used, including and not limited to; for example, teeth, waves, bumps, dots and etc.

For vertically hung fenders, as illustrated in FIG. 10, locking device works synergistically with gravitational force to securely maintain the position of a fender on a line. As shown, a pin-like locking device as disclosed herein may be inserted firmly into the hole at the bottom of a vertically hung fender that contains the line and locks the fender to maintain its position on the line. In the vertically hung configuration, the weight of the fender and the pulling tendency of the line, combined with the natural swing motion, further presses and pulls the locking device deeper into the through-hole for greater holding strength. A greater pulling force on the line increases the wedging effect within the through-hole, forcing the line to squeeze tightly against one side of the through-hole, which in turn also tightly squeezes the locking device against the other side (e.g., back surface 340) of the through-hole. In some embodiments, the line is made of a soft flexible material and the fender material is flexible. As a fender stopper twists under load, the ribs grip tighter, resulting in greater interactions between the locking device, along the back surface of the shaft and at the ribs, thereby creating improved holding force.

In some embodiments, like fenders, a locking device may be manufactured out of rubber, foam elastomer or plastic. In some embodiments, a locking device may be made of harder material such as wood or metal.

Unless otherwise noted, terms are to be understood according to conventional usage by those of ordinary skill in the relevant art.

The various methods and techniques described above provide numerous embodiments. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

In some embodiments, the numbers expressing quantities of ingredients, properties such as molecular weight, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The invention claimed is:

1. A locking device for securely positioning an object on a line via a through-hole on the object, the locking device comprising:
    an elongated shaft having an outer circumference and an inner circumference defining a partial cavity, the elongated shaft or a deepest portion of the partial cavity or both being tapered relative to a longitudinal axis of the shaft,
    wherein the partial cavity extends along an entirety of the longitudinal axis of the shaft, and
    wherein the deepest portion of the partial cavity and the exterior surface of the elongated shaft forms a tapering angle.

2. The locking device of claim 1, wherein the tapering angle is from 2 degrees to 10 degrees.

3. The locking device of claim 1, wherein the tapering angle is from 2 degrees to 7 degrees.

4. The locking device of claim 1, wherein the tapering angle is from 3 degrees to 5 degrees.

5. The locking device of claim 1, wherein the tapering angle is 3 degrees.

6. The locking device of claim 1, wherein the surface of the partial cavity has a pattern for increasing interactions between the line and the locking device.

7. The locking device of claim 6, wherein the pattern is selected from the group consisting of horizontal lines, horizontal waves, round bumps, rectangular bumps, triangular bumps, bumps of random shapes, and combinations thereof.

8. The locking device of claim 1, wherein at least a portion of the elongated shaft of the locking device is configured to fit within the through-hole on a fender.

9. The locking device of claim 1, wherein at least a portion of the elongated shaft of the locking device is configured to fit within the through-hole on a boat fender.

10. The locking device of claim 1, wherein the elongated shaft comprises one or more materials selected from the group consisting of rubber, foam elastomer, plastic, wood and metal.

11. The locking device of claim 1, further comprising a head, coupled to the elongated shaft, wherein the head has a width that is larger than the width of the elongated shaft.

12. The locking device of claim 11, wherein the head and elongated shaft are permanently connected at the larger end of the elongated shaft.

13. A method for securely positioning an object on a line by a through-hole of the object, comprising:
    positioning the object on the line, after the object has been strung on the line by passing the line through the through-hole,
    wherein the positioning step comprises inserting a locking device into a first opening of the through-hole;
    wherein the locking device is inserted in an orientation such that the partial cavity on the front side accommodates the line to cause the line to extend from the partial cavity on both ends of locking device, and
    wherein the locking device comprises:
        an elongated shaft having an outer circumference and an inner circumference defining a partial cavity, the elongated shaft or a deepest portion of the partial cavity or both being tapered relative to a longitudinal axis of the shaft,
        wherein the partial cavity extends along an entirety of the longitudinal axis of the shaft, and
        wherein the deepest portion of the partial cavity and the exterior surface of the elongated shaft forms a tapering angle.

14. The method of claim 13, wherein at least a portion of the elongated shaft of the locking device is configured to fit within the through-hole on a fender.

15. The method of claim 13, wherein the tapering angle is selected from the group consisting of an angle from 2 degrees to 10 degrees, an angle from 2 degrees to 7 degrees, an angle from 3 degrees to 5 degrees, and an angle of 3 degrees.

16. The method of claim 13, wherein the surface of the partial cavity has a pattern for increasing interactions between the line and the locking device.

17. The method of claim 16, wherein the pattern is selected from the group consisting of horizontal lines, horizontal waves, round bumps, rectangular bumps, triangular bumps, bumps of random shapes, and combinations thereof.

18. A method for securely positioning an object on a line by a through-hole of the object, comprising:
    positioning the object on the line, after the object has been strung on the line by passing the line through the through-hole,
    wherein the positioning step comprises inserting a first pin-like locking device into a first opening of the through-hole and inserting a second pin-like locking device into the second opening of the through-hole;
    wherein the first and second pin-like locking device each comprises:
        an elongated shaft having an outer circumference and an inner circumference defining a partial cavity, the elongated shaft or a deepest portion of the partial cavity or both being tapered relative to a longitudinal axis of the shaft, wherein the partial cavity extends along an entirety of the longitudinal axis of the shaft, and wherein the deepest portion of the partial cavity and the exterior surface of the elongated shaft forms a tapering angle.

19. The method of claim 18, wherein at least a portion of the elongated shaft of the locking device is configured to fit within the through-hole on a fender.

20. The method of claim 18, wherein the tapering angle is selected from the group consisting of an angle from 2 degrees to 10 degrees, an angle from 2 degrees to 7 degrees, an angle from 3 degrees to 5 degrees, and an angle of 3 degrees.

21. The method of claim 18, wherein the surface of the partial cavity has a pattern for increasing interactions between the rope or line and the first locking device.

22. The method of claim 18, wherein the pattern is selected from the group consisting of horizontal lines, horizontal waves, round bumps, rectangular bumps, triangular bumps, bumps of random shapes, and combinations thereof.

* * * * *